US008024418B1

(12) United States Patent
De Groote (10) Patent No.: US 8,024,418 B1
(45) Date of Patent: Sep. 20, 2011

(54) RESERVE RELEASE PROXY

(75) Inventor: Stephen P. De Groote, Maple Grove, MN (US)

(73) Assignee: Cisco Technology, Inc., San Jose, CA (US)

( * ) Notice: Subject to any disclaimer, the term of this patent is extended or adjusted under 35 U.S.C. 154(b) by 1654 days.

(21) Appl. No.: 10/280,161

(22) Filed: Oct. 25, 2002

(51) Int. Cl.
*G06F 15/167* (2006.01)
*G06F 13/00* (2006.01)

(52) U.S. Cl. ......... 709/215; 709/225; 711/150; 711/152

(58) Field of Classification Search .................. 709/211, 709/212, 217–219, 223, 225–229; 711/112, 711/150–153, 167–169; 714/4; 370/401, 370/466
See application file for complete search history.

(56) References Cited

U.S. PATENT DOCUMENTS

| | | | | |
|---|---|---|---|---|
| 5,657,480 A * | 8/1997 | Jacobson | ....................... | 713/500 |
| 5,765,004 A * | 6/1998 | Foster et al. | .................. | 713/323 |
| 5,812,751 A * | 9/1998 | Ekrot et al. | ........................ | 714/4 |
| 5,860,156 A * | 1/1999 | Williams | ....................... | 711/221 |
| 6,041,394 A * | 3/2000 | Halligan et al. | ............... | 711/166 |
| 6,145,089 A * | 11/2000 | Le et al. | .............................. | 714/4 |
| 6,148,410 A * | 11/2000 | Baskey et al. | ....................... | 714/4 |
| 6,209,023 B1 * | 3/2001 | Dimitroff et al. | ............. | 709/211 |
| 6,247,099 B1 * | 6/2001 | Skazinski et al. | .............. | 711/141 |
| 6,400,730 B1 * | 6/2002 | Latif et al. | ..................... | 370/466 |
| 6,526,521 B1 * | 2/2003 | Lim | ................................. | 714/4 |
| 6,633,962 B1 * | 10/2003 | Burton et al. | .................. | 711/163 |
| 6,636,877 B1 * | 10/2003 | Doleac et al. | .................. | 707/203 |
| 6,681,339 B2 * | 1/2004 | McKean et al. | .................... | 714/5 |
| 6,683,883 B1 * | 1/2004 | Czeiger et al. | ................. | 370/401 |
| 6,728,905 B1 * | 4/2004 | Gnanasivam et al. | .......... | 714/43 |
| 6,728,963 B1 * | 4/2004 | Forin et al. | ...................... | 719/310 |
| 6,851,005 B1 * | 2/2005 | Gnanasivam et al. | ........ | 710/220 |
| 6,934,799 B2 * | 8/2005 | Acharya et al. | ............... | 711/112 |
| 6,996,672 B2 * | 2/2006 | Lubbers et al. | ............... | 711/114 |
| 7,277,952 B2 * | 10/2007 | Nishanov et al. | .............. | 709/229 |
| 7,315,914 B1 * | 1/2008 | Venkatanarayanan et al. | ............................. | 710/316 |
| 7,542,987 B2 * | 6/2009 | Lubbers et al. | ........................ | 1/1 |
| 2001/0052030 A1 * | 12/2001 | Shiraishi | ....................... | 709/310 |
| 2003/0225859 A1 * | 12/2003 | Radia et al. | ..................... | 709/219 |
| 2004/0022256 A1 * | 2/2004 | Green | .......................... | 370/401 |
| 2005/0223183 A1 * | 10/2005 | Pherson et al. | ............... | 711/163 |
| 2005/0229021 A1 * | 10/2005 | Lubbers et al. | ................... | 714/2 |
| 2006/0101204 A1 * | 5/2006 | Bao | ................................ | 711/114 |

OTHER PUBLICATIONS

Simitci et al, Evaluation of SCSI Over TCP/IP and SCSI Over Fibre Channel Connections, IEEE 2001.*

* cited by examiner

*Primary Examiner* — Patrice L Winder
*Assistant Examiner* — Julian Chang
(74) *Attorney, Agent, or Firm* — Schwegman, Lundberg & Woessner, P.A.

(57) ABSTRACT

A method, system, apparatus, and signal-bearing media for finding a logical unit data structure associated with a command and a logical unit of a device, selecting a command table based on the logical unit data structure and a host that issued the command, indexing the command into the command table, and performing a routine indicated by the command table in response to the indexing. The command table may be a normal command table if no other host has reserved the logical unit or a reserved command table if another host has reserved the logical unit.

28 Claims, 7 Drawing Sheets

| NORMAL COMMAND TABLE ||
|---|---|
| COMMAND CODE | ROUTINE |
| 12 | POINTER TO PASS-COMMAND-TO DEVICE ROUTINE |
| 16 | POINTER TO RESERVE ROUTINE |
| 17 | POINTER TO RELEASE ROUTINE |
| 18 | POINTER TO PASS-COMMAND-TO DEVICE ROUTINE |

FIG. 4A

| RESERVED COMMAND TABLE ||
|---|---|
| COMMAND CODE | ROUTINE |
| 12 | POINTER TO PASS-COMMAND-TO DEVICE ROUTINE |
| 16 | POINTER TO CONFLICT ROUTINE |
| 17 | POINTER TO CONFLICT ROUTINE |
| 18 | POINTER TO CONFLICT ROUTINE |

RESERVE RELEASE PROXY

FIELD OF THE INVENTION

This invention relates generally to networks of computers and more particularly to accessing a device at a remote computer via a network.

BACKGROUND OF THE INVENTION

Computer systems need a way to store and retrieve data from a variety of data devices, such as disk drives, printers, display screens, and scanners. In the past, each computer typically had its own directly-attached devices, which no other computer was capable of using. But, this was a cumbersome and expensive design because sharing data among computers was difficult and a particular device might stay idle and unused for lengthy periods. For example, a retail store might have multiple cash registers, but each cash register storing its own price/product data locally is less efficient and more cumbersome than every cash register accessing the same price/product data on one common disk drive. Also, a printer is a device that a computer user might need for only short periods, so each computer attaching its own local printer is more expensive than multiple computers sharing one printer.

In order to overcome the aforementioned cumbersome and expensive solutions, computers were connected in networks, and one computer was allowed to store and retrieve data from another computer's data devices. But, accessing data devices on another computer created the problem of multiple computers attempting to access the same device concurrently. For example, one computer might attempt to read data from a tape drive while another might attempt to issue a rewind command to the same tape drive, yielding unpredictable results.

SUMMARY OF THE INVENTION

The present invention provides solutions to the above-described shortcomings in conventional approaches, as well as other advantages apparent from the description below. A method, system, and signal-bearing media are provided for finding a logical unit data structure associated with a command and a logical unit of a device, selecting a command table based on the logical unit data structure and a host that issued the command, indexing the command into the command table, and performing a routine indicated by the command table in response to the indexing. The command table may be a normal command table if no other host has reserved the logical unit or a reserved command table if another host has reserved the logical unit.

DETAILED DESCRIPTION OF THE INVENTION

In the following detailed description of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

Figure 1:
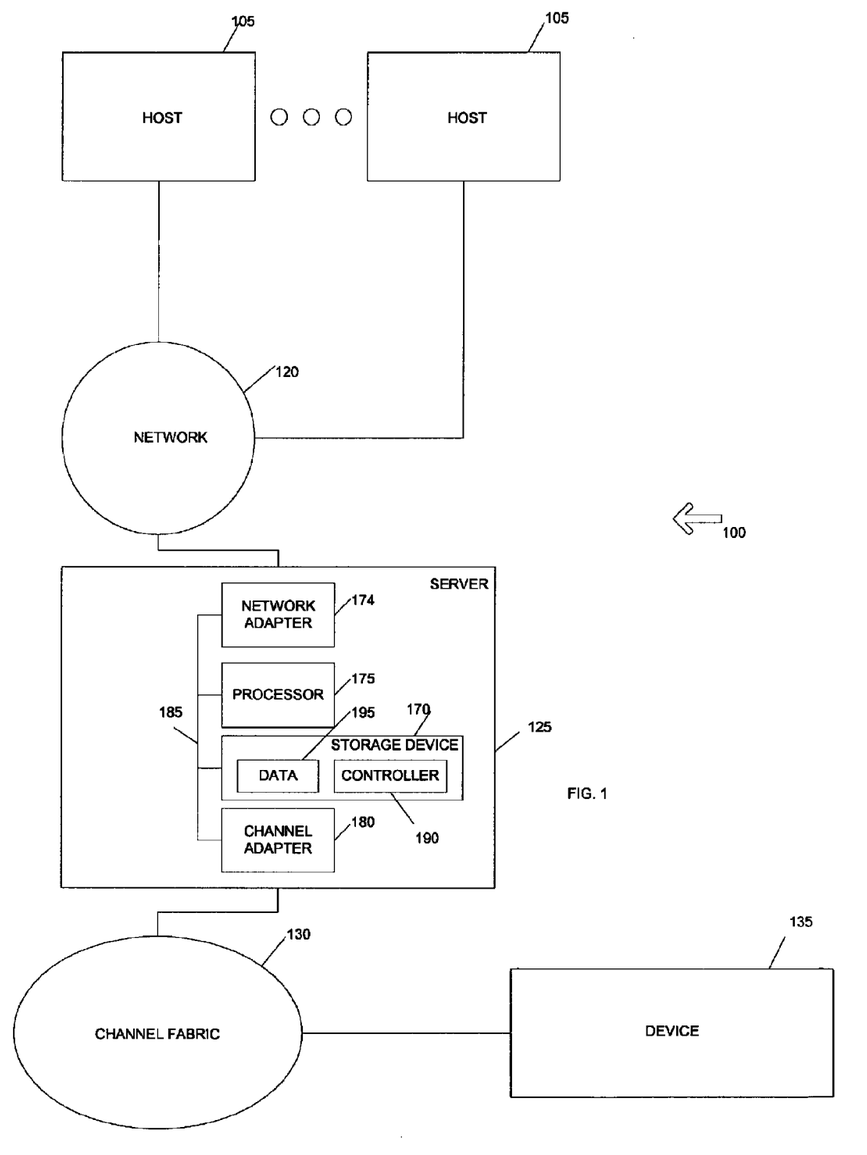
FIG. 1 depicts a pictorial example of a network of computer systems and devices that may be used to implement an embodiment of the invention.

FIG. 1 depicts an example system 100, including a network of computer systems and devices that may be used to implement an embodiment of the invention. Hosts 105 are communicatively coupled to a network 120. The network 120 is communicatively coupled to a server computer 125, which is communicatively coupled to a channel fabric 130, which is communicatively coupled to a device 135. The hosts 105 may be computers or other electronic devices that wish to store and/or retrieve data to/from the device 135. Although two hosts 105 are shown, in other embodiments any number may be present.

Networked systems often follow a client/server architecture. In an embodiment, a client is a process (i.e., a program or task) executing on a computer that requests a service provided by another program or computer. In another embodiment, the client is the computer itself. The client utilizes the requested service without needing to know any working details about the other program or the service itself. In networked systems, a client is usually a computer that accesses shared network resources provided by another computer, such as server.

The network 120 may include many servers and/or many clients, which act to pass information between them. In an embodiment, the network 120 utilizes the TCP/IP protocol. TCP/IP is an acronym for "Transport Control Protocol/Internet Protocol," a protocol developed by the Department of Defense for facilitating communications between computers. In an embodiment, iSCSI protocol commands are sent through the network 120 using TCP/IP. iSCSI is a protocol for sending SCSI (Small Computer System Interface) commands over the Internet. SCSI is a standard high-speed parallel interface defined by the X3T9.2 committee of the American National Standards Institute (ANSI).

The network 120 provides the hosts 105 with a means of electronically communicating information, including software, with a remote computer or a network logical-storage device. In addition, the network 120 may support distributed processing, which enables the hosts 105 to share a task with other computer systems linked to the network. The network 120 may include a plurality of networks, each of which could include a plurality of individual computers. The hosts 105 and the server 125 may be connected directly to the network 120 via a standard telephone line, a dedicated cable, or a wireless communications link, or may be connected indirectly to the network 120 via another network or a client and/or another server.

The server 125 may be a computer remote from the hosts 105 over the network 120. Based on requests from the hosts 105 the server 125 may store and/or retrieve data to/from the device 135.

The server 125 may include a storage device 170, a network adapter 174, a processor 175, a storage 278 and a channel adapter 180, which are all connected via a system bus 185. The server 125 is capable of communicating across the network 120 using a TCP/IP (Transmission Control Protocol/Internet Protocol) connection, although any suitable communications protocol could be used.

The storage device 170 may be any type of computer memory, volatile or non-volatile. In an embodiment, the storage device 170 may be one or more hard disk drives. In another embodiment, the storage device 170 may be ROM (read only memory), a tape drive, a diskette drive, a CD-ROM drive, or any device or combination of devices capable of storing instructions and data. Although the storage device 170 is shown incorporated into the server 125, in other embodiments, it may be external to the server 125, either connected directly, on a local area network (LAN), on the network 120, or as part of the device 135.

The storage device 170 may include a controller 190, which contains instructions capable of being executed by the processor 175. In another embodiment, the controller 190 may be implemented by control circuitry though the use of logic gates, programmable logic devices, or other hardware components in lieu of a processor-based system. Although the controller 190 is shown contained within the storage device 170, in another embodiment, the controller 190 may be part of the channel adapter 180. Operations of the controller 190 are further described below with reference to FIGS. 5, 6, and 7.

The storage device 170 may also include data 195 that the controller may use in carrying out its operations. The format of the data 195 is further described below with reference to FIGS. 2, 3, 4A and 4B.

The processor 175 may be any type of computer processor. Processor 175 accesses data and instructions from and stores data to the storage device 170. The processor 175 executes instructions and includes that portion of the server 125 that controls the operation of the entire computer system, including executing the arithmetical and logical functions contained in a particular computer program. The processor 175 organizes data and program storage in the storage device 170 and transfers data and other information between the various part of the computer system. The processor 175 accesses data and instructions from and stores data to the storage device 170. Although the server 125 is shown to contain only a single processor and a single system bus, the present invention applies equally to computer systems that have multiple processors and to computer systems that have multiple buses that each perform different functions in different ways.

The server 125 may be implemented using any suitable computer such as a Cisco SN5420 Universal Access Server. Portable computers, laptop computers, and network computers or Internet appliances are other possible configurations. The hardware depicted in FIG. 1 may vary for specific applications. For example, other peripheral devices such as optical-disk media, audio adapters, or chip programming devices, such as PAL or EPROM programming devices may be used in addition to or in place of the hardware already depicted. Thus, an embodiment of the invention may apply to any hardware configuration that allows attachment of devices, regardless of whether the hardware configuration is a complicated, multi-user computing apparatus, a single-user workstation, or a network appliance that does not have non-volatile storage of its own.

The channel fabric 130 transfers data between the server 125 and the device 135. In an embodiment, the channel fabric 130 may be implemented using the Fibre Channel I/O (Input/Output) protocol. Fibre Channel is an asynchronous, serial I/O protocol that is unaware of the content or meaning of the information being transferred. In other embodiments, any suitable I/O protocol may be used, such as the SCSI (Small Computer System Interface) or IDE (Integrated Device Electronics) protocols.

The device 135 may be any I/O (input/output) device, such as a workstation, hard disk drive, disk array, diskette drive, CD-ROM drive, DVD (Digital Video Disc) drive, tape drive, scanner, medical instrument, or any other device capable of receiving and/or sending data. Although only one device 135 is shown, in another embodiment multiple devices may be present. Further, the device 135 may include multiple, separately addressable logical units. For example, one device may include an array of separately addressable disk drives or multiple tape drives.

In an embodiment of the system 100, a user or software application at the hosts 105 may issue a command to store or retrieve data on the device 135. The request is converted into one or more SCSI commands and/or data and encapsulated by representing them as a serial string of bytes proceeded by iSCSI headers. The encapsulated data is broken up into packets suitable for transfer over the network according to the TCP/IP protocol and sent over the network 120. The server 125 recombines the packets into the original encapsulated SCSI commands and data. The server 125 then converts the SCSI commands and data into Fibre Channel commands and sends them across the channel fabric 130 to the device 135, which performs the functions that were originally requested by the hosts 105.

Although the system 100 has been described in the context of TCP/IP, Fibre Channel, and iSCSI, any suitable protocols may be used. For example, SCSI or IDE may be used instead of Fibre Channel for one or both of the interfaces between the hosts 105, the server 125, and the device 135.

Although the various components of FIG. 1 are drawn as single entities, each may consist of multiple entities and may exist at multiple levels.

As will be described in detail below, aspects of an embodiment pertain to specific method steps implementable on computers. In another embodiment, the invention may be implemented as a computer program product for use with a computer system. The programs defining the functions of the embodiment may be delivered to a computer via a variety of signal-bearing media, which include, but are not limited to:

(1) information permanently stored on a non-rewriteable storage medium (e.g., a read only memory device within a computer such as a CD-ROM disk) readable by a CD-ROM drive;

(2) alterable information stored on a writeable storage medium (e.g., a hard disk drive or diskette); or (3) information conveyed to a computer by a communications medium, such as through a computer or telephone network including wireless communications.

Such signal-bearing media, when carrying computer-readable instructions that direct the functions of the present invention, represent embodiments of the present invention.

Figure 2:
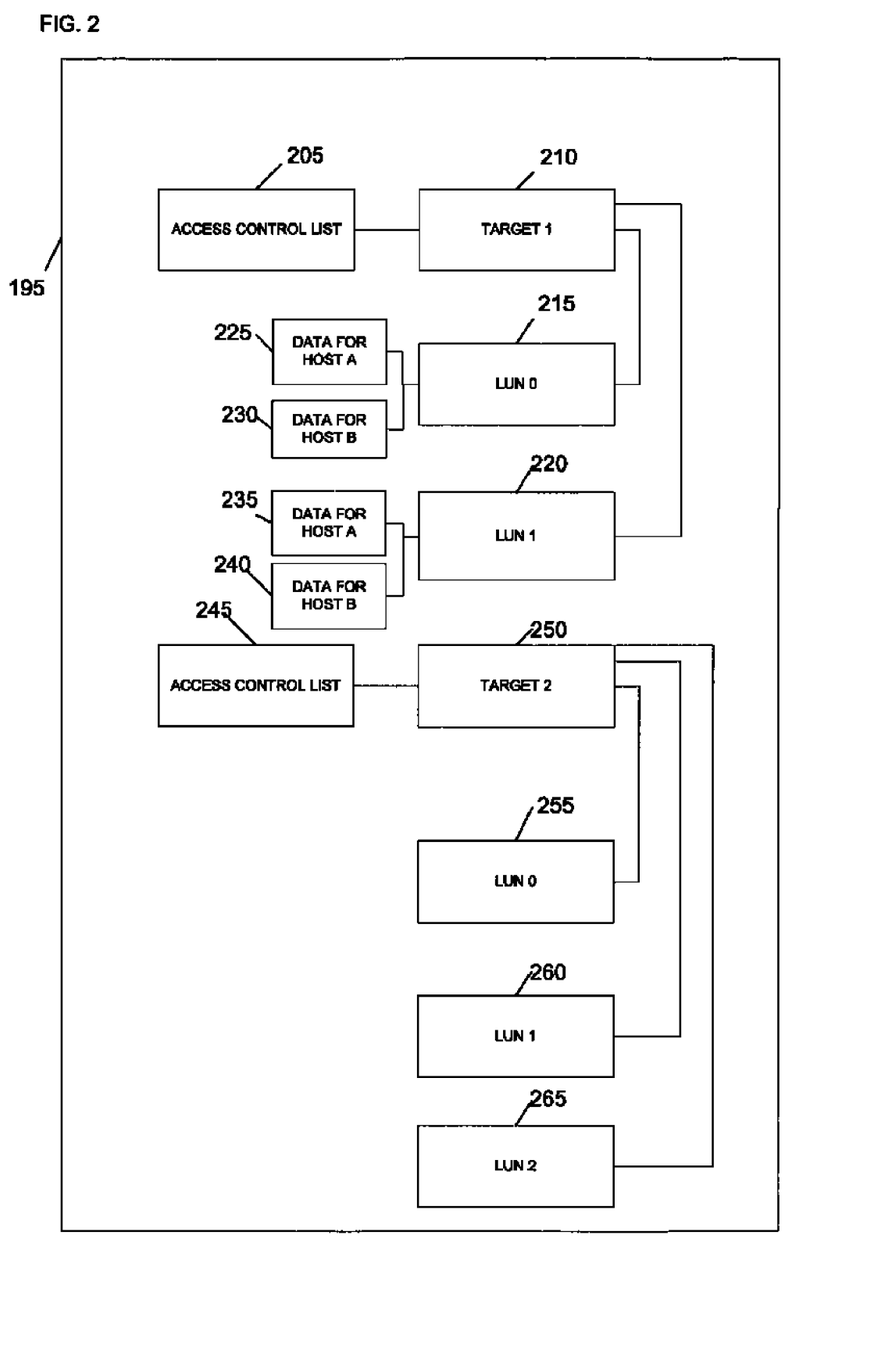
FIG. 2 depicts a block diagram of example data structures that may be used to to implement an embodiment of the invention.

FIG. 2 depicts a block diagram of example data structures, which may be a part of the data 195, that may be used to implement an embodiment of the invention. Illustrated are targets 210 and 250, which may be data structures that represent devices attached to the server 125, such as the device 135. Associated with the target 210 are LUNs (logical unit numbers) 215 and 220, which are data structures that represent separately addressable logical units within the device associated with the target 210. Associated with the target 250 are LUNs 255, 260, and 265, which are data structures that represent separately addressable logical units within the device associated with the target 250. Although two targets 210 and 250 are shown, any number may be present. Although two LUNs 215 and 220 are shown associated with the target 210 and three LUNs 255, 260, and 265 are shown associated with the target 250, any number may be present.

Associated with the LUN 215 are data for host A 255 and data for host B 230. Associated with the LUN 220 are data for host A 235 and data for host B 240. Thus, each host that is accessing a particular LUN may have its own associated data for that LUN within the data 195. Although two hosts are shown accessing LUN 215 and the same two host are shown accessing the LUN 220, in another embodiment any number of the same or different hosts may be accessing the LUNs.

The data for host A 225 may contain an indication of which command table is to be used when commands from host A directed to LUN 215 are processed. The data for host B 230 may contain an indication of which command table is to be used when commands from host B directed to LUN 215 are processed. The data for host A 235 may contain an indication of which command table is to be used when commands from host A directed to LUN 220 are processed. The data for host B 240 may contain an indication of which command table is to be used when commands from host B directed to LUN 220 are processed. Command tables are further described below with reference to FIGS. 4A and 4B.

An access control list 205 is associated with the target 210, and an access control list 245 is associated with the target 250. Access control lists may include addresses of hosts that are allowed to access the respective targets.

The format for the targets, the LUNs, and the data are further described below with reference to FIGS. 3, 4A and 4B.

Figure 3:
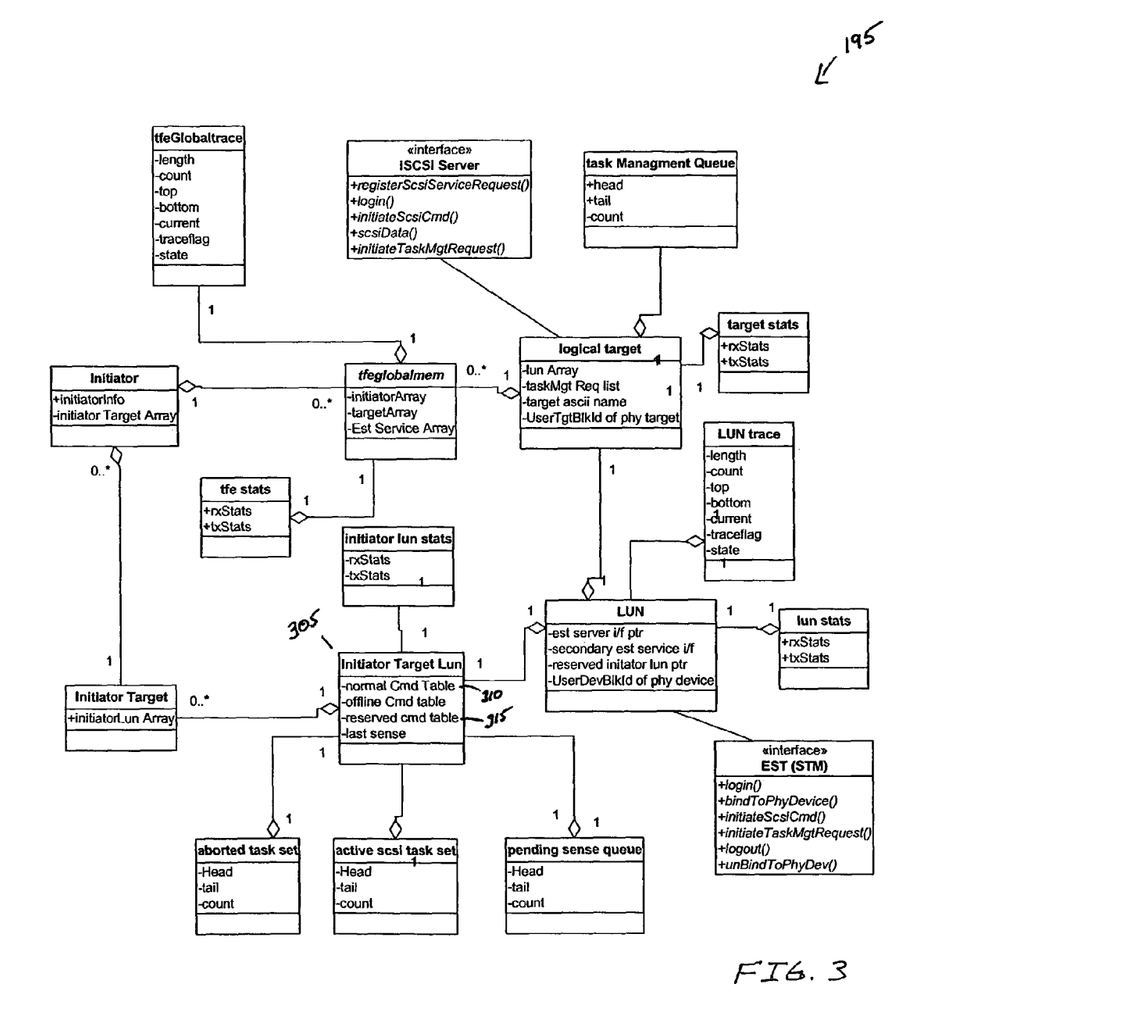
FIG. 3 depicts a block diagram of example data structures that may be used to implement an embodiment of the invention.

FIG. 3 depicts a block diagram of example data structures, which may be a part of data 195, that may be used to implement an embodiment of the invention. The LUN 305, which may represent any of LUN 215, 220, 255, 260, or 265 (FIG. 2), may include a pointer to a normal command table 310 and a pointer to a reserved command table 315, which the controller 190 (FIG. 1) may use to perform the operations further described below with reference to FIGS. 5, 6, and 7. The normal command table is further described below with reference to FIG. 4A, and the reserved command table is further described below with reference to FIG. 4B.

Figure 4A:
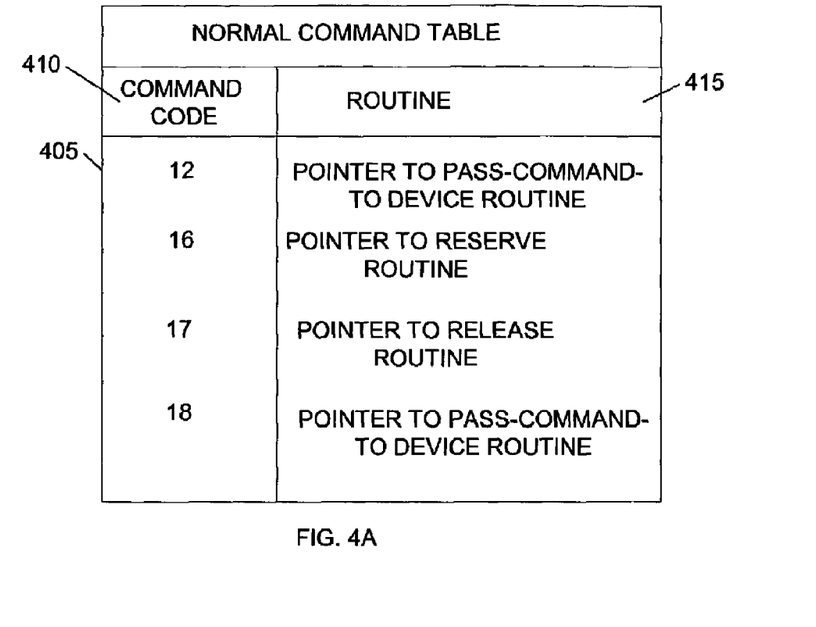
FIG. 4A depicts a block diagram of an example data structure for a normal command table that may be used to implement an embodiment of the invention.

FIG. 4A depicts a block diagram of an example data structure for a normal command table 405 that may be used to implement an embodiment of the invention. A command table is also called a jump table. The server 125 (FIG. 1) may use the normal command table 405 when the LUN associated with the normal command table is not reserved, as further described below with reference to FIGS. 5, 6, and 7. The command table 405 may be a part of data 195, which is shown in FIG. 1. The command table 405 may contain a command code field 410 and a routine field 415. The command code field 410 may contain data identifying commands that the server 125 (FIG. 1) may receive from the hosts 105.

The routine field 415 may contain pointers to routines that the server 125 is to execute when the associated command code is received. For example, when a command identified by code "12" is received (in this example a query status command), the server 125 is to pass the command to the device using the routine identified in the routine field 415. When a command identified by code "16" is received (in this example a reserve command), the server 125 is to reserve the associated LUN by calling the reserve routine. When a command identified by code "17" is received (in this example a release command), the server 125 is to release the associated LUN by calling the release routine. When a command identified by code "18" is received (in this example a write command), the server 125 is to pass the command to the device by calling a pass-command to device routine. The example data in the command code field 410 and the routine field 415 is exemplary only, and any appropriate data may be used.

Figure 4B:
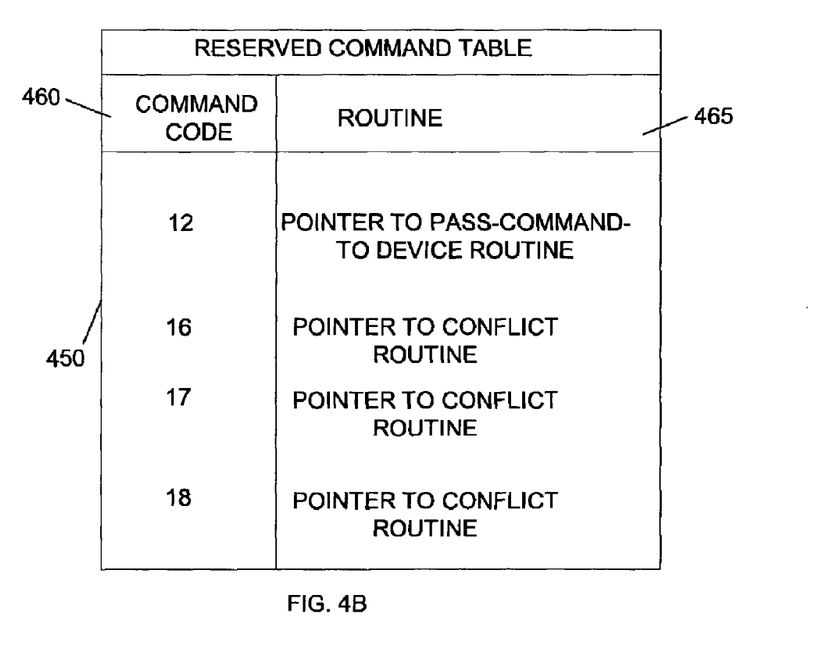
FIG. 4B depicts a block diagram of an example data structure for a reserved command table that may be used to implement an embodiment of the invention.

FIG. 4B depicts a block diagram of an example data structure for a reserved command table 450 that may be used to implement an embodiment of the invention. The server 125 (FIG. 1) may use the reserved command table 450 when the LUN associated with the reserved command table 450 is reserved, as further described below with reference to FIGS. 5, 6, and 7. The command table 450 may contain a command code field 460 and a routine field 465. The command code field 450 may contain data identifying commands that the server 125 (FIG. 1) may receive from the hosts 105.

The routine field 465 may contain pointers to routines that the server 125 is to execute when the associated command code is received. For example, when a command identified by code "12" is received (in this example a query status command), the server 125 is to pass the command to the device using the routine identified in the routine field 465 because a particular host may query a LUN for status even though another host has the LUN reserved. When a command identified by code "16" is received (in this example a reserve command), the server 125 is to call a conflict-handling routine, since the LUN may not be reserved when it is already reserved. The conflict-handling routine may, for example, return an error status to the host. When a command identified by code "17" is received (in this example a release command), the server 125 is to call a conflict-handling routine since a particular host may not release a LUN that another host has reserved. When a command identified by code "18" is received (in this example a write command), the server 125 is to call a conflict-handling routine since a particular host may not write to a device associated with the LUN that another host has reserved. The conflict-handling routine may, for example, refrain from sending the write command to the device and may return an error status to the host. The example data in the command code field 460 and the routine field 465 is exemplary only, and any appropriate data may be used.

Figure 5:
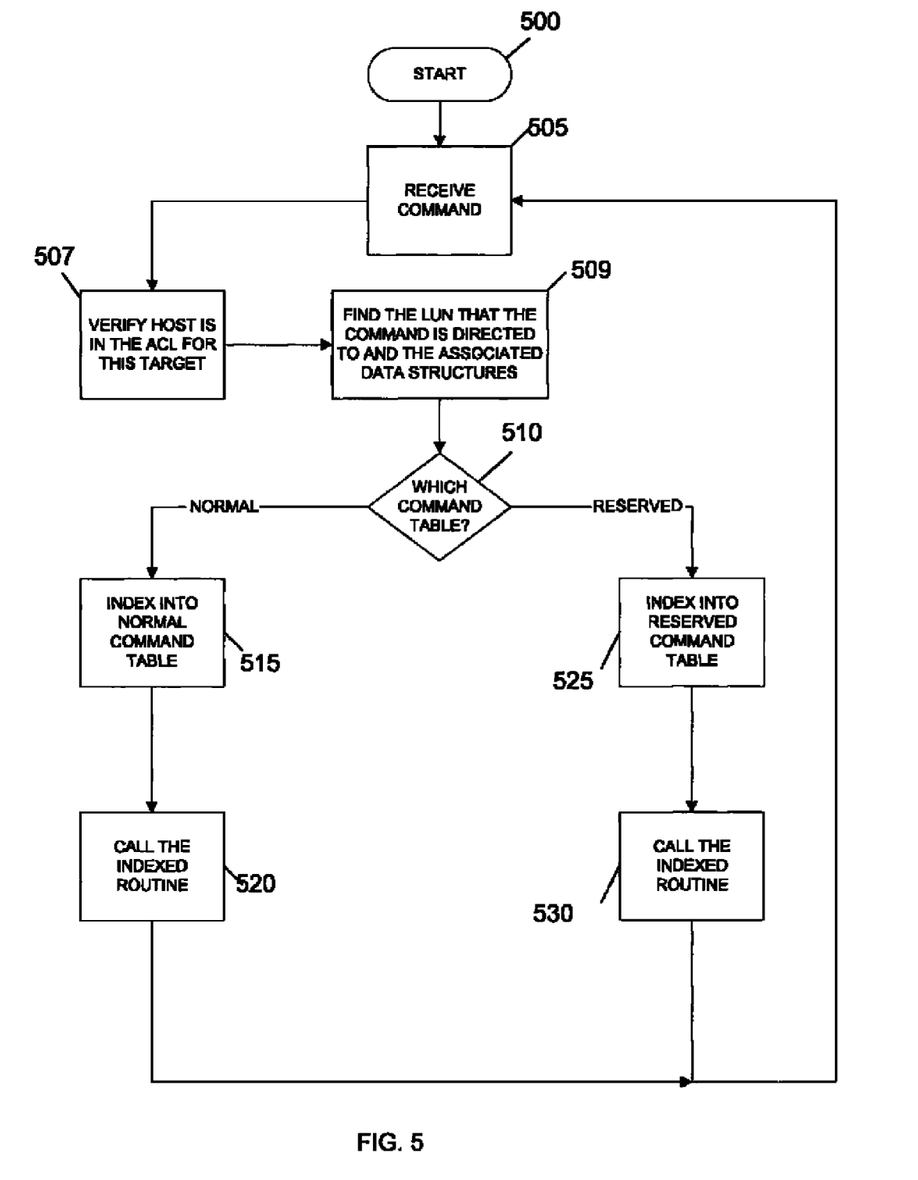
FIG. 5 depicts a flowchart that describes the operation of a command processing function, according to an embodiment of the invention.

FIG. 5 depicts a flowchart that describes the operation of a command processing function, according to an embodiment of the invention. Control begins at block 500. Control then continues to block 505 where the controller 190 receives a command from one of the hosts 105 across the network 120. Control then continues to block 507 where the controller 190 verifies that the host that issued the command is authorized to access the target to which the command is directed by comparing the address of the host to a list of authorized addresses in the access control list associated with the target. Control then continues to block 509 where the controller 190 finds the LUN data structure associated with the LUN to which the command is directed and the host data (e.g., 225, 230, 235, or 240 in FIG. 2) associated with the LUN data structure and the host that issued the command. Control then continues to block 510 where the controller 190 determines which command table to use (e.g. the normal command table of FIG. 4A or the reserved command table of FIG. 4B) based on an indication in the host data that was previously found in block 509. Thus, the command table to be used is selected based on both the LUN (and its data structure) to which the command is directed and the host that issued the command.

If the determination at bock 510 indicates that the command table is the normal command table, then control continues to block 515 where the controller 190 uses a command code associated with the received command as an index into the normal command table to find a routine. Control then continues to block 520 where the controller 190 calls the indexed routine. Control then returns to block 505, as previously described above.

If the determination at block 510 indicates that the command table to be used is the reserved command table, then control continues to block 525 where the controller 190 uses a command code associated with the received command as an index into the reserved command table. Control then continues to block 530 where the controller 190 calls the indexed routine. Control then returns to block 505, as previously described above.

Figure 6:
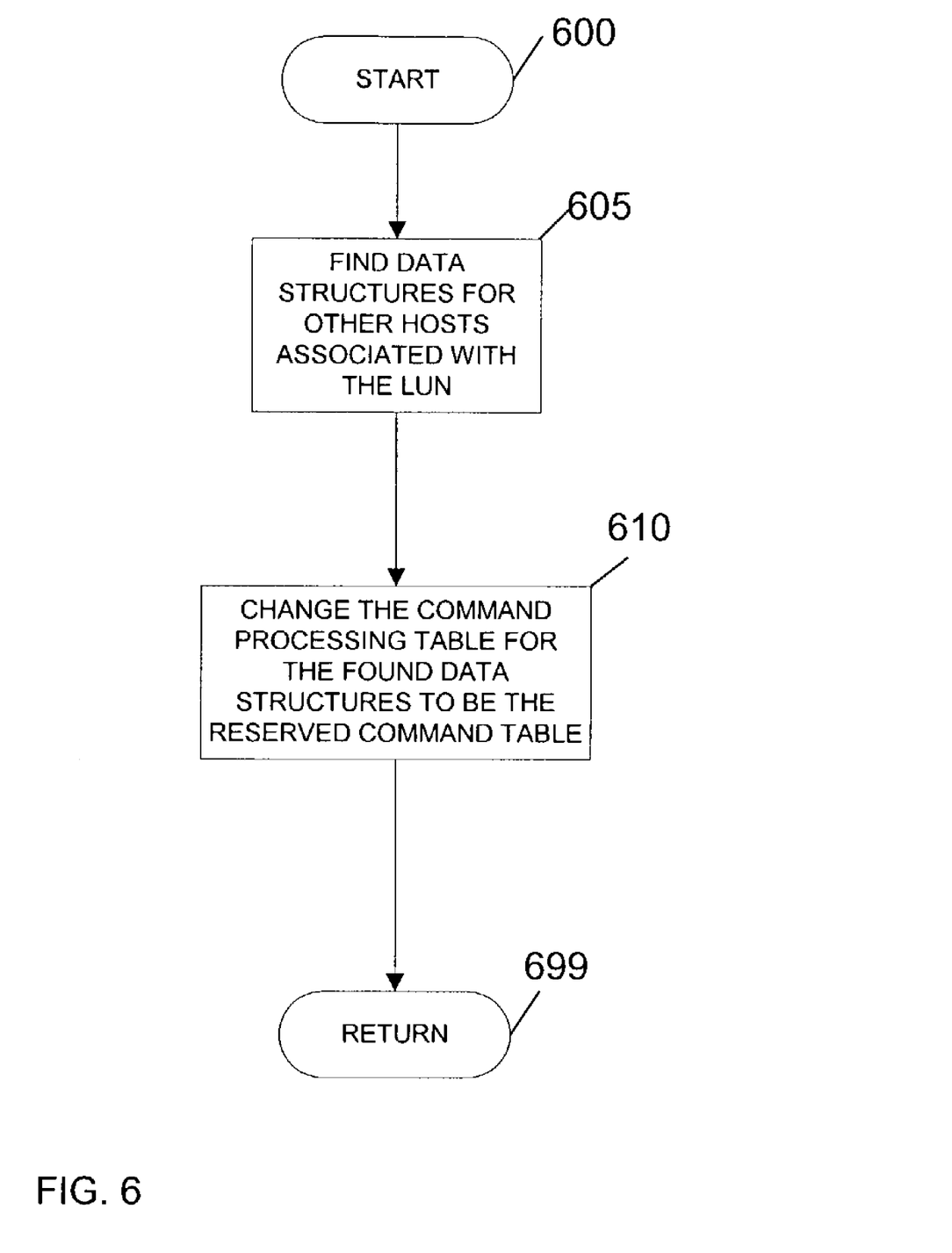
FIG. 6 depicts a flowchart that describes the operation of a reserve function, according to an embodiment of the invention.

FIG. 6 depicts a flowchart that describes the operation of a reserve function, according to an embodiment of the invention. The functions of FIG. 6 may be of FIG. 4A is used and the received command code is "16." Control begins at block 600.

Control then continues to block 605 where the controller 190 finds data structures for other hosts associated with the current LUN. Control then continues to block 610 where the controller 190 changes the host data found at block 605 to indicate that the reserved command table is to be used. For example, if host A issued the reserve command directed to LUN 215 (FIG. 2), then the controller 190 changes data for host B 230 (FIG. 2) to indicate that the reserved command table is to be used.

Control then continues to block 699 where the function returns.

Figure 7:
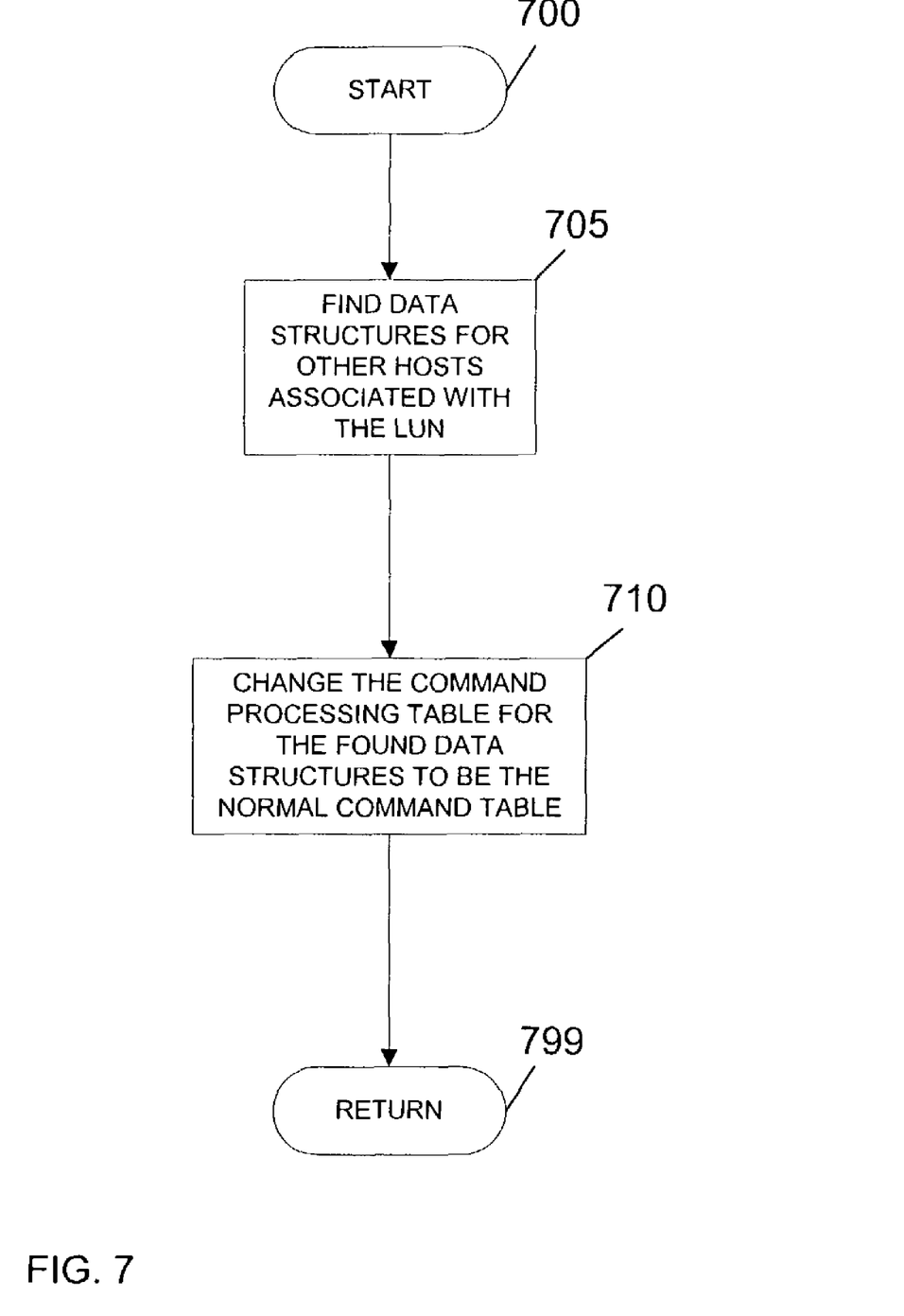
FIG. 7 depicts a flowchart that describes the operation of a release function, according to an embodiment of the invention.

FIG. 7 depicts a flowchart that describes the operation of a release function, according to an embodiment of the invention. The functions of FIG. 7 may be called, for example, from block 520 of FIG. 5 when the normal command table 405 of FIG. 4A is used and the received command code is "17." Control begins at block 700. Control then continues to block 705 where the controller 190 finds data structures for other hosts associated with the current LUN. Control then continues to block 710 where the controller 190 changes the command processing table for the data structures found at block 705 to be the normal command table, an example of which is shown in FIG. 4A. Control then continues to block 799 where the function returns.

What is claimed is:

1. A method for performing commands at a router device connected to a plurality of hosts and to a storage device including memory, wherein each of the hosts is configured to transmit an access request to the storage device via the router device, wherein the router device includes a plurality of logical unit data structures, wherein each logical unit data structure is associated with a portion of the memory of the storage device and is designated by a logical unit number (LUN), comprising:
   providing a plurality of command tables at the router device, wherein the command tables include a reserved command table and a normal command table, wherein the reserved command table is separate from the normal command table;
   storing, in the reserved command table, functions to be performed for specific commands received from one or more of the plurality of hosts when one or more of the logical unit data structures are reserved by a corresponding one of the one or more hosts;
   storing, in the normal command table, functions to be performed for the same specific commands when the one or more of the logical unit data structures are not reserved by the corresponding one of the one or more hosts;
   assigning, at the router device, logical unit data structures of the router device to each host, wherein assigning includes establishing a separate host/logical unit data structure associated with each host/logical unit pair, wherein the host/logical unit data structure defines when a corresponding logical unit data structure of the router device is reserved by a corresponding one of the hosts;
   receiving, at the router device, a command from one of the plurality of hosts over the network;
   selecting a command table to be used to perform the command, wherein selecting is a function of the host/logical unit data structure associated with the host that transmitted the command over the network, wherein selecting includes choosing the reserved command table if the host/logical unit data structure indicates that the logical unit data structure associated with the host/logical unit data structure is reserved by another host and choosing the normal command table if the host/logical unit data structure indicates that the logical unit data structure associated with the host/logical unit data structure is not reserved by other hosts; and
   performing the command using the selected command table, wherein performing includes executing a routine indicated by the selected command table.

2. The method of claim 1, wherein performing includes:
   determining whether the command is a reserve command; and
   when the command is a reserve command, indicating in the host/logical unit data structures for other hosts that a reserved command table is to be used for commands to be received from the other hosts.

3. The method of claim 1, wherein performing includes:
   determining whether the command is a release command; and
   when the command is a release command, indicating in the host/logical unit data structures for other hosts that a normal command table is to be used for commands to be received from the other hosts.

4. The method of claim 1, wherein selecting includes verifying that an address of the host is in an access control list for the router device, wherein the access control list includes addresses of hosts that are allowed to access the storage device.

5. The method of claim 1, wherein performing includes passing the command to the router device.

6. The method of claim 1, wherein performing includes executing a conflict-handling routine.

7. The method of claim 1, wherein the command is expressed as a command code and wherein performing includes indexing the selected command table with the command code.

8. An apparatus for performing commands at a router device connected to a plurality of hosts and to a storage device including memory, wherein each of the hosts is configured to transmit an access request to the storage device via the router device, wherein the router device includes a plurality of logical unit data structures, wherein each logical unit data structure is associated with a portion of the memory of the storage device and is designated by a logical unit number (LUN), comprising:

means for providing a plurality of command tables at the router device, wherein the command tables include a reserved command table and a normal command table, wherein the reserved command table is separate from the normal command table;

means for storing, in the reserved command table, functions to be performed for specific commands received from one or more of the plurality of hosts when one or more of the logical unit data structures are reserved by a corresponding one of the one or more hosts;

means for storing, in the normal command table, functions to be performed for the same specific commands when the one or more of the logical unit data structures are not reserved by the corresponding one of the one or more hosts;

means for assigning, at the router device, logical unit data structures of the router device to each host, wherein means for assigning includes means for establishing a separate host/logical unit data structure associated with each host/logical unit pair, wherein the host/logical unit data structure defines when a corresponding logical unit data structure of the router device is reserved by a corresponding one of the hosts;

means for receiving, at the router device, a command from one of the plurality of hosts over the network;

means for selecting a command table to be used to perform the command, wherein selecting is a function of the host/logical unit data structure associated with the host that transmitted the command over the network, wherein means for selecting includes means for choosing the reserved command table if the host/logical unit data structure indicates that the logical unit data structure associated with the host/logical unit data structure is reserved by another host and means for choosing the normal command table if the host/logical unit data structure indicates that the logical unit data structure associated with the host/logical unit data structure is not reserved by other hosts; and means for performing the command using the selected command table, wherein means for performing includes means for executing a routine indicated by the selected command table.

9. The apparatus of claim 8, wherein means for performing includes:

means for determining whether the command is a reserve command; and when the command is a reserve command, means for indicating in the host/logical unit data structures for other hosts that a reserved command table is to be used for commands to be received from the other hosts.

10. The apparatus of claim 8, wherein means for performing includes:

means for determining whether the command is a release command; and when the command is a release command, means for indicating in the host/logical unit data structures for other hosts that a normal command table is to be used for commands to be received from the other hosts.

11. The apparatus of claim 8, wherein means for selecting includes means for verifying that an address of the host is in an access control list for the router device, wherein the access control list includes addresses of hosts that are allowed to access the storage device.

12. The apparatus of claim 8, wherein means for performing includes means for passing the command to the router device.

13. The apparatus of claim 8, wherein means for performing includes means for executing a conflict-handling routine.

14. The apparatus of claim 8, wherein the command is expressed as a command code and wherein means for performing includes means for indexing the selected command table with the command code.

15. A non-transitory computer-readable medium storing instructions for performing commands at a router device connected to a plurality of hosts and to a storage device including memory, wherein each of the hosts is configured to transmit an access request to the storage device via the router device, wherein the router device includes a plurality of logical unit data structures, wherein each logical unit data structure is associated with a portion of the memory of the storage device and is designated by a logical unit number (LUN), wherein the instructions, when executed by a computer, cause the computer to perform operations comprising:

providing a plurality of command tables at the router device, wherein the command tables include a reserved command table and a normal command table, wherein the reserved command table is separate from the normal command table;

storing, in the reserved command table, functions to be performed for specific commands received from one or more of the plurality of hosts when one or more of the logical unit data structures are reserved by a corresponding one of the one or more hosts;

storing, in the normal command table, functions to be performed for the same specific commands when the one or more of the logical unit data structures are not reserved by the corresponding one of the one or more hosts;

assigning, at the router device, logical unit data structures of the router device to each host, wherein assigning includes establishing a separate host/logical unit data structure associated with each host/logical unit pair, wherein the host/logical unit data structure defines when a corresponding logical unit data structure of the router device is reserved by a corresponding one of the hosts;

receiving, at the router device, a command from one of the plurality of hosts over the network;

selecting a command table to be used to perform the command, wherein selecting is a function of the host/logical unit data structure associated with the host that transmitted the command over the network, wherein selecting includes choosing the reserved command table if the host/logical unit data structure indicates that the logical unit data structure associated with the host/logical unit data structure is reserved by another host and choosing the normal command table if the host/logical unit data structure indicates that the logical unit data structure associated with the host/logical unit data structure is not reserved by other hosts; and performing the command using the selected command table, wherein performing includes executing a routine indicated by the selected command table.

16. The computer-readable medium of claim 15, wherein performing includes:

determining whether the command is a reserve command; and when the command is a reserve command, indicating in the host/logical unit data structures for other hosts that a reserved command table is to be used for commands to be received from the other hosts.

17. The computer-readable medium of claim 15, wherein performing includes:
  determining whether the command is a release command; and
  when the command is a release command, indicating in the host/logical unit data structures for other hosts that a normal command table is to be used for commands to be received from the other hosts.

18. The computer-readable medium of claim 15, wherein selecting includes verifying that an address of the host is in an access control list for the router device, wherein the access control list includes addresses of hosts that are allowed to access the storage device.

19. The computer-readable medium of claim 15, wherein performing includes passing the command to the router device.

20. The computer-readable medium of claim 15, wherein performing includes executing a conflict-handling routine.

21. The computer-readable medium of claim 15, wherein the command is expressed as a command code and wherein performing includes indexing the selected command table with the command code.

22. A server for performing commands at a router device connected to a plurality of hosts and to a storage device including memory, wherein each of the hosts is configured to transmit an access request to the storage device via the router device, wherein the router device includes a plurality of logical unit data structures, wherein each logical unit data structure is associated with a portion of the memory of the storage device and is designated by a logical unit number (LUN), comprising:
  a processor; and
  a storage device encoded with instructions, wherein the storage device comprises:
    means for providing a plurality of command tables at the router device, wherein the command tables include a reserved command table and a normal command table, wherein the reserved command table is separate from the normal command table;
    means for storing, in the reserved command table, functions to be performed for specific commands received from one or more of the plurality of hosts when one or more of the logical unit data structures are reserved by a corresponding one of the one or more hosts;
    means for storing, in the normal command table, functions to be performed for the same specific commands when the one or more of the logical unit data structures are not reserved by the corresponding one of the one or more hosts;
    means for assigning, at the router device, logical unit data structures of the router device to each host, wherein means for assigning includes means for establishing a separate host/logical unit data structure associated with each host/logical unit pair, wherein the host/logical unit data structure defines when a corresponding logical unit data structure of the router device is reserved by a corresponding one of the hosts;
    means for receiving, at the router device, a command from one of the plurality of hosts over the network;
    means for selecting a command table to be used to perform the command, wherein selecting is a function of the host/logical unit data structure associated with the host that transmitted the command over the network, wherein means for selecting includes means for choosing the reserved command table if the host/logical unit data structure indicates that the logical unit data structure associated with the host/logical unit data structure is reserved by another host and means for choosing the normal command table if the host/logical unit data structure indicates that the logical unit data structure associated with the host/logical unit data structure is not reserved by other hosts; and
    means for performing the command using the selected command table, wherein means for performing includes means for executing a routine indicated by the selected command table.

23. The server of claim 22, wherein means for performing includes:
  means for determining whether the command is a reserve command; and
  when the command is a reverse command, means for indicating in the host/logical unit data structures for other hosts that a reserved command table is to be used for commands to be received from the other hosts.

24. The server of claim 22, wherein means for performing includes:
  means for determining whether the command is a release command; and
  when the command is a release command, means for indicating in the host/logical unit data structures for other hosts that a normal command table is to be used for commands to be received from the other hosts.

25. The server of claim 22, wherein means for selecting includes means for verifying that an address of the host is in an access control list for the router device, wherein the access control list includes addresses of hosts that are allowed to access the storage device.

26. The server of claim 22, wherein means for performing includes means for passing the command to the router device.

27. The server of claim 22, wherein means for performing includes means for executing a conflict-handling routine.

28. The server of claim 22, wherein the command is expressed as a command code and wherein means for performing includes means for indexing the selected command table with the command code.

* * * * *